United States Patent [19]

Tannehill et al.

[11] Patent Number: 5,427,209
[45] Date of Patent: Jun. 27, 1995

[54] VEHICLE WASHING AID

[76] Inventors: William B. Tannehill, 563 Oak Brook Dr., Martinez, Ga. 30907; Clyde D. Arey, 1220 St Matthews Church Rd.; Rodney D. Arey, 1320 St. Matthews Church Rd., both of, Salisbury, N.C. 28146

[21] Appl. No.: 212,047

[22] Filed: Mar. 14, 1994

[51] Int. Cl.⁶ .............................................. B60T 3/00
[52] U.S. Cl. ....................................... 188/32; 410/30
[58] Field of Search ................. 414/430, 401; 410/30, 410/49; 188/32; 248/75, 76

[56] References Cited

U.S. PATENT DOCUMENTS

| | | | |
|---|---|---|---|
| D. 328,857 | 8/1992 | Ceko et al. | D8/356 |
| 3,734,241 | 5/1973 | Hale | 188/32 |
| 3,754,305 | 8/1973 | Kline | 24/256 |
| 3,858,690 | 1/1975 | Facemire | 188/32 X |
| 4,679,818 | 7/1987 | Kakavas | 188/32 X |
| 4,778,135 | 10/1988 | Legard | 188/32 X |
| 4,884,664 | 12/1989 | Berg | 188/32 |
| 4,895,225 | 1/1990 | Parnell | 188/32 |

*Primary Examiner*—Michael S. Huppert
*Assistant Examiner*—James Eller

[57] ABSTRACT

A vehicle washing aid for positioning underneath a vehicle tire to elevate the tire relative to a ground surface for washing and dressing of the tire and for precluding the catching of a water hose between the tire and the ground surface.

1 Claim, 3 Drawing Sheets

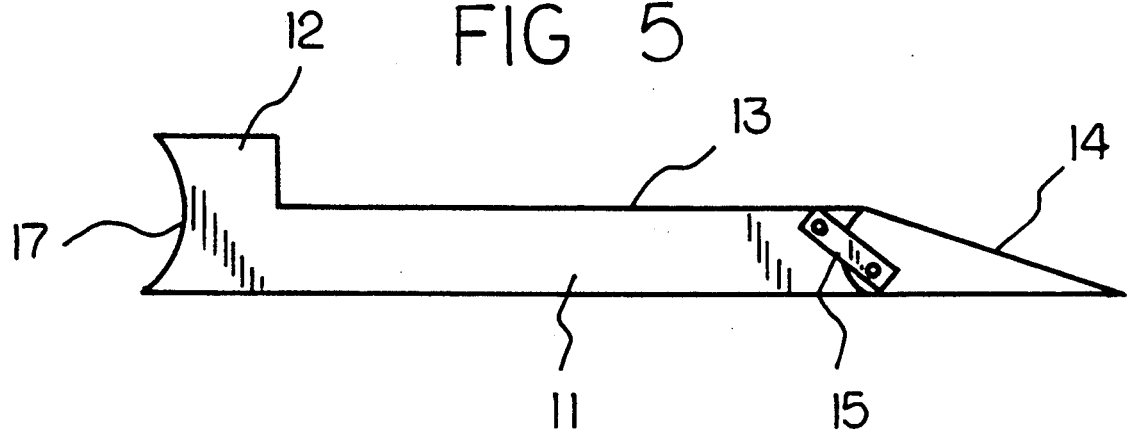
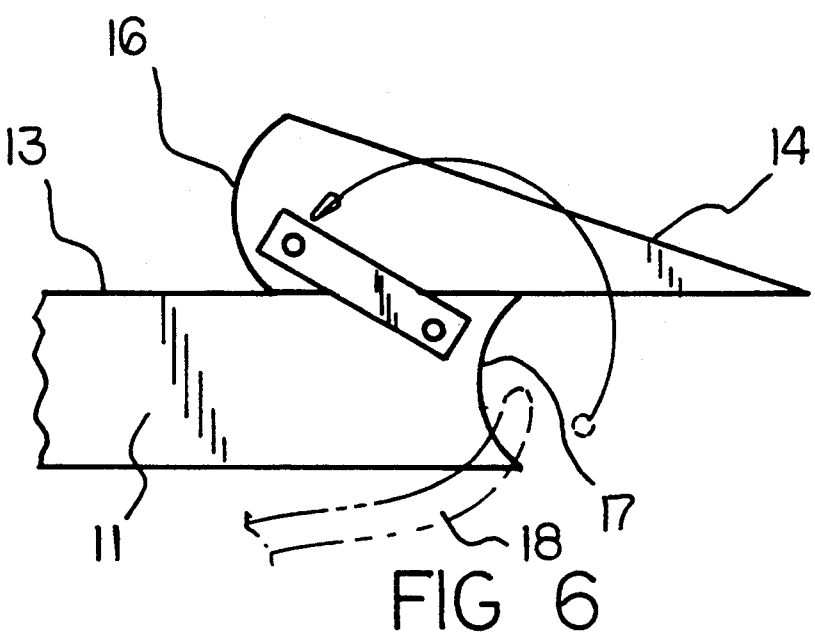

VEHICLE WASHING AID

BACKGROUND OF THE INVENTION

1. Field of the Invention

The present invention relates to a vehicle washing aid and more particularly pertains to a device which may be used to easily and securely raise a vehicle's tires off the ground for easy access and to prevent wedging of a water hose against such tires during washing of the vehicle.

2. Description of the Prior Art

The use of devices to prevent hoses from wedging against tires on a vehicle during washing thereof is known in the prior art. More specifically, devices heretofore devised and utilized for such purpose are known to consist basically of familiar, expected and obvious structural configurations, notwithstanding the myriad of designs encompassed by the crowded prior art which have been developed for the fulfillment of countless objectives and requirements. Such devices generally clamp around or against a vehicle tire and are not positively held against accidental displacement. They also operate with the vehicle wheels on the ground. Typical devices of this type are illustrated in U.S. Pat. Nos. 4,884,664; 4,895,225; 3,754,305; 4,778,135; and U.S. Pat. Des. No. 328,857.

In this respect, the device according to the present invention substantially departs from the conventional concepts and designs of the prior art, and is positively held against the tires in a manner to prevent accidental displacement and also elevates the tires for easier cleaning thereof.

Therefore, it can be appreciated that there exists a continuing need for new and improved device which can be utilized to prevent hose wedging during vehicle washing. In this regard, the present invention substantially fulfills this need.

SUMMARY OF THE INVENTION

In view of the foregoing disadvantages inherent in the known types of vehicle washing aid now present in the prior art, the present invention provides an improved construction wherein the same can be utilized to present the vehicle wheels for easier cleaning and to position hose guides where they cannot be accidentally dislodged. As such, the general purpose of the present invention, which will be described subsequently in greater detail, is to provide a new apparatus which has many of the advantages of the devices mentioned heretofore and many novel features that result in a vehicle washing aid which is not anticipated, rendered obvious, suggested, or even implied by any of the prior art devices, either alone or in any combination thereof.

To attain this, the present invention generally relates to a vehicle washing aid designed to lift a vehicle a short distance above the floor or ground to permit complete and easy access to the entire circumference of the vehicle tires for washing and dressing the tires and to prevent contact with the tires and wedging of a water hose being moved around the vehicle during washing thereof which comprises: a pair of blocks for the front wheels and a second pair of blocks for the rear wheels of a vehicle; all of said blocks having a stop at one end and a slanted ramp at the other end thereof whereby a vehicle may be driven up onto such blocks; the ramps on the rear set of blocks having a pivot thereon to permit swinging them up to form safety chocks for the rear wheels once they are positioned atop the blocks, both pairs of blocks having a curved hose receiving and guiding channel at their outer ends, such channel on the forward blocks being at the end opposite the slanted ramp while the channel on the rear blocks is under the ramp ends and is exposed when such ramps are pivoted upwardly to form the safety chocks.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle washing aid which has many of the advantages of the devices mentioned heretofore and many novel features that result in a vehicle washing aid which is not anticipated, rendered obvious, suggested, or even implied by any of the prior art devices, either alone or in any combination thereof.

It is another object of the present invention to provide a new and improved vehicle washing aid which may be easily and efficiently manufactured and marketed.

It is a further object of the present invention to provide a new and improved vehicle washing aid which is of a durable and reliable construction.

An even further object of the present invention is to provide a new and improved vehicle washing aid which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved vehicle washing aid which provides in the apparatuses of the prior art some of the advantages thereof, while simultaneously overcoming some of the disadvantages normally associated therewith.

Still another object of the present invention is to provide a new and improved vehicle washing aid which will elevate the wheels of a vehicle to permit better cleaning thereof.

Yet another object of the present invention is to provide a new and improved vehicle washing aid which cannot be accidentally dislodged in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side plan view of a rear block of the present invention with the ramp end down to permit a vehicle wheel to roll up thereon.

FIG. 6 is a side plan view of a rear block of the present invention showing the ramp end pivoted into the up or safety chock position.

DESCRIPTION OF THE PREFERRED EMBODIMENT

Figure 1:
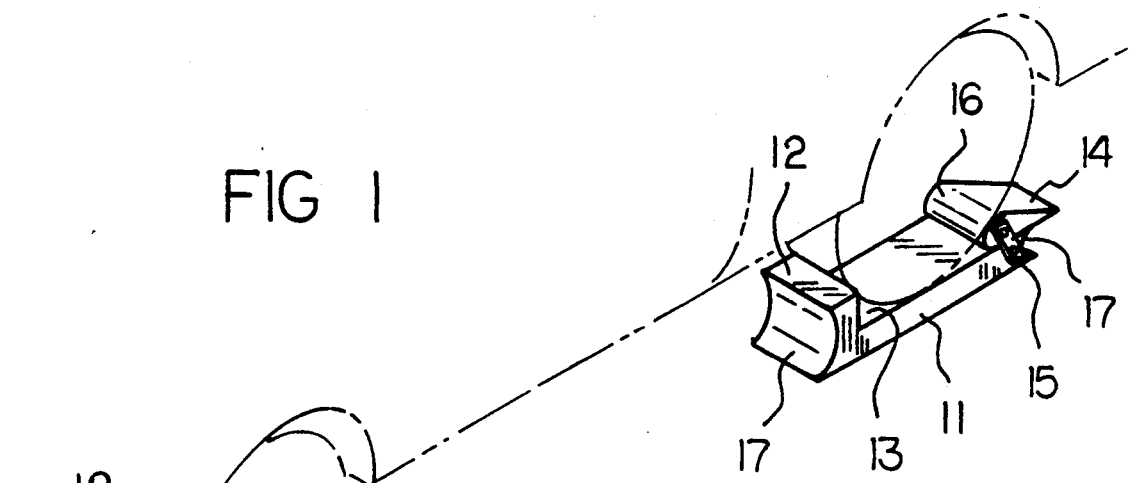
FIG. 1 is a perspective view of the present invention in place on a vehicle.

With reference now to the drawings, and in particular to FIG. 1 thereof, a new and improved vehicle washing aid embodying the principles and concepts of the present invention will be described.

Figure 2:
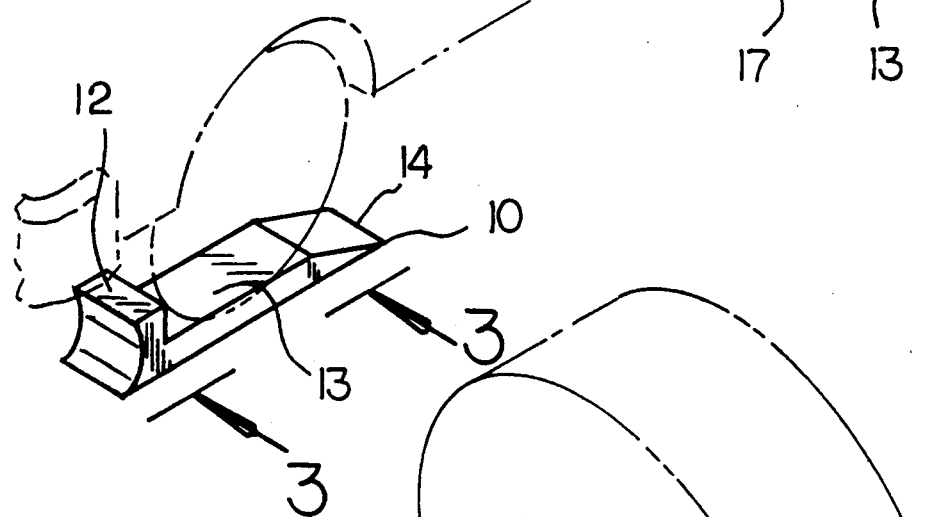
FIG. 2 is an enlarged perspective view of a rear block of the present invention showing a vehicle wheel locked therein.
Figure 2:
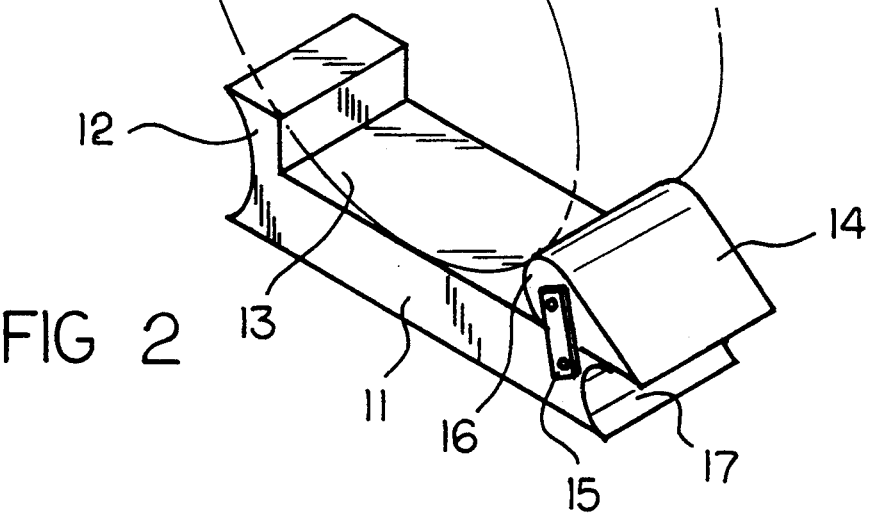

The present invention utilizes a pair of blocks 10 and 11 for each side of the vehicle to be washed. Each block 10 and 11 has a forward stop end 12, a central support platform 13, and a rearward ramp end 14. The vehicle (shown in broken lines in FIG. 1) is driven forward after blocks 10 and 11 are placed in front of the tires thereof on each side of the vehicle. Once the wheels are in position on the support platform 13 of the blocks with the front of each tire engaging the forward stop end 12 of such blocks, the ramp end 14 on the rear blocks 11 is pivoted upward to form a safety chock preventing the vehicle from shifting backwards. As seen in FIG. 1 and in larger detail in FIG. 2, the ramp end 14 on the rear blocks 11 is a separate unit from the rest of block 11 and is affixed thereto by a rectangular brace 15 anchored to the block 11 and to the ramp end section 14 so as to permit ramp end 14 to pivot upwardly with respect to the rest of block 11. The forward end 16 of the ramp section 14 wedges against the back of the rear vehicle tire and holds it in position. Such forward end 16 is curved in order that in the down position, such forward end 16 will snugly fit into a curved, hose receiving and guiding channel 17 formed in block 11 and exposed when ramp end section 14 is pivoted upwardly.

Figure 3:
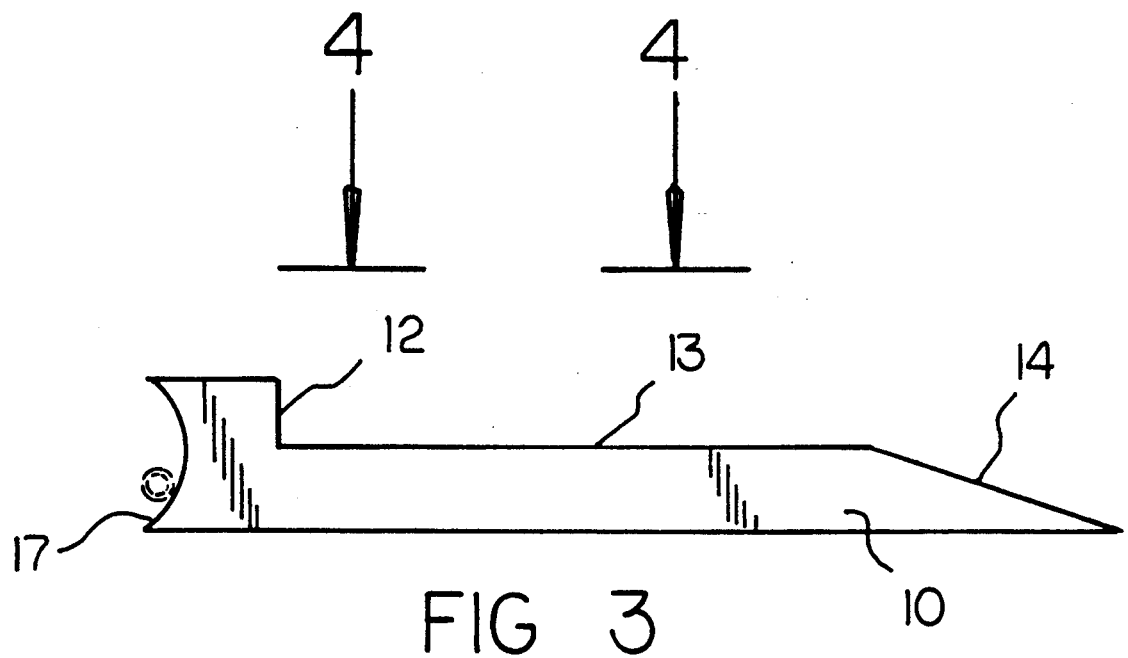
FIG. 3 is a side plan view on line 3—3 of a front block of the present invention.
Figure 4:
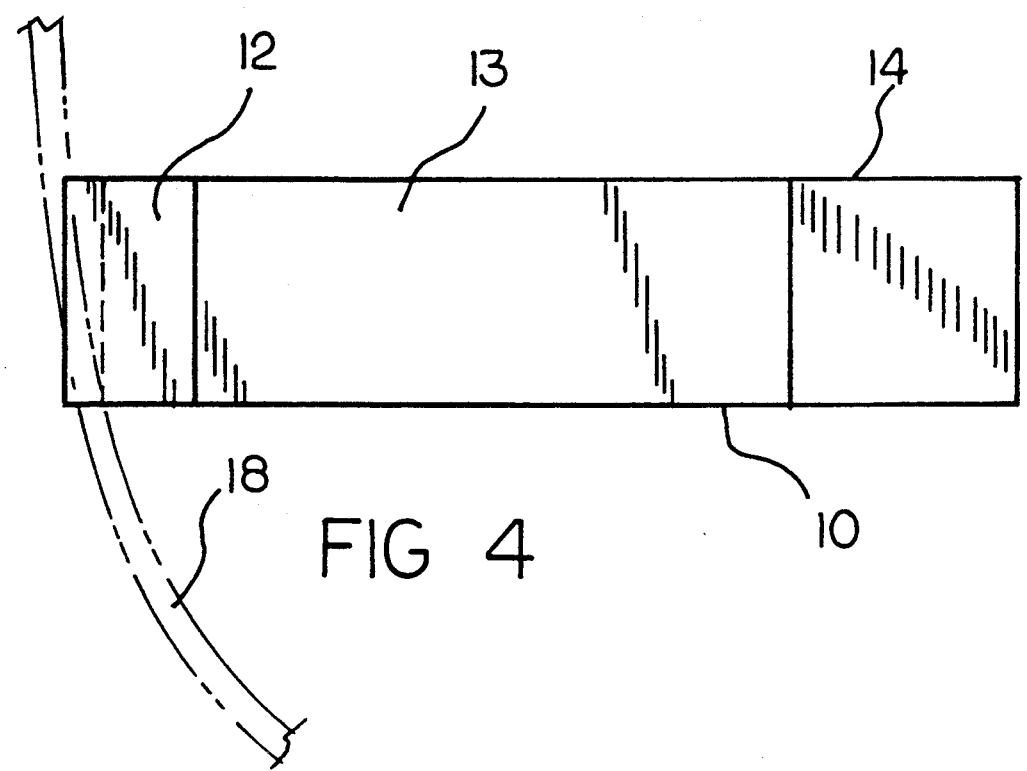
FIG. 4 is a top plan view on line 4—4 of FIG. 3 showing a water hose in use in conjunction with a front block.

FIG. 3 illustrates that the forward blocks 10 likewise have a curved, hose receiving and guiding channel 17, such channel 17 being positioned in the forward stop end of blocks 10. The ramp end 14 of such forward blocks 10 does not pivot as does the ramp end 14 on rear blocks 11. Also shown (in broken lines) in this FIG. 3, is a water hose 18 riding in channel 17, illustrating the manner in which such hose 18 is prevented from engaging with a vehicle tire resting on platform 13. This is also shown in a top view of block 10 as illustrated in FIG. 4.

FIGS. 5 and 6 illustrate the pivoted ramp 14 on the rear blocks 11 and also show a second hose receiving and guiding channel 17 in the forward end 12 of rear block 11. Such second channel 17 is not essential since the hose used in washing seldom will be put through under the vehicle but illustrates that with the configuration of the present invention it could be so inserted if desired. FIG. 5 shows ramp end 14 in the down or loading position ready for a vehicle tire to be run up thereon. FIG. 6 illustrates such ramp end 14 pivoted about the brace 15 into the safety chock mode illustrated in FIG. 1. Again, a broken line representation of a water hose 18 lying within channel 17 is shown.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle washing aid comprising:
a central support platform having a first end longitudinally spaced from a second end, a longitudinal axis, and a transverse axis, said central support platform further having a planar top surface upon which a vehicle tire can be positioned, and a pair of opposed and substantially parallel lateral walls extending substantially parallel to said longitudinal axis, said central support platform having a first hose receiving channel formed into said first end thereof, said first hose receiving channel extending from a first one of said lateral walls across a transverse length of said central support platform to a second one of said lateral walls, said first hose receiving channel being oriented so as to extend substantially parallel to said transverse axis of said central support platform;

a forward stop end member fixedly secured to said second end of said central support platform and projecting substantially orthogonally upward from said central support platform so as to be engagable to a vehicle tire positionable upon said central support platform to preclude a longitudinal translation of the vehicle tire past said second end of said central support platform, said forward stop end member having opposed lateral walls extending into contiguous communication with said lateral walls of said central support platform and a straight vertical wall extending into contiguous communication with said planar top surface of said central support platform, said forward stop end member further including a second hose receiving channel formed on an opposed side thereof relative to the straight vertical wall, said second hose receiving channel extending from a first one of said lateral walls of said forward stop end member across a transverse length of said forward stop end member to a second one of said lateral walls of said forward stop end member, said second hose receiving channel being oriented so as to extend substantially parallel to said transverse axis of said central support platform;

a ramp end section having first end second ends, a substantially planar bottom surface, and an angled top surface oriented so as to extend at an oblique angle relative to said planar bottom surface, said top surface intersecting said bottom surface at said first end of said ramp end section, with said second end of said ramp end section being semi-cylindrical in shape so as to extend into said first hose receiving channel, said ramp end section having a pair of opposed lateral walls extending between said top and bottom surfaces; and, a brace member pivotally coupled to one of said lateral walls of said central support platform and one of said lateral walls of said ramp end section so as to pivotally and movable couple the ramp end section relative to said central support platform, whereby said ramp end section can be positioned relative to said central support platform with said semi-cylindrical second end of said ramp end section extending into said first hose receiving channel to facilitate a placement of a vehicle tire upon said central support platform, said ramp end section further being positionable relative to said central support platform such that said bottom surface of said ramp end section is positioned on said top surface of said central support platform with said semi-cylindrical second end of said ramp end section being positioned for engagement with a vehicle tire positionable upon said top surface of said central support platform to preclude a longitudinal translation of the vehicle tire past said first end of said central support platform.

* * * * *